(12) United States Patent
Sekine

(10) Patent No.: US 9,482,891 B2
(45) Date of Patent: Nov. 1, 2016

(54) LIQUID CRYSTAL DISPLAY UNIT

(71) Applicant: NLT Technologies, Ltd., Kanagawa (JP)

(72) Inventor: Hiroyuki Sekine, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 55 days.

(21) Appl. No.: 14/669,046

(22) Filed: Mar. 26, 2015

(65) Prior Publication Data

US 2015/0277172 A1 Oct. 1, 2015

(30) Foreign Application Priority Data

Mar. 28, 2014 (JP) .................. 2014-068285

(51) Int. Cl.
| | |
|---|---|
| *G02F 1/136* | (2006.01) |
| *G02F 1/1333* | (2006.01) |
| *G09G 3/30* | (2006.01) |
| *G09G 3/36* | (2006.01) |
| *G02F 1/133* | (2006.01) |
| *G02F 1/1335* | (2006.01) |
| *G02F 1/1368* | (2006.01) |
| *G02F 1/1345* | (2006.01) |

(52) U.S. Cl.
CPC ......... *G02F 1/13306* (2013.01); *G02F 1/1368* (2013.01); *G02F 1/13454* (2013.01); *G02F 1/133345* (2013.01); *G02F 1/133512* (2013.01); *G02F 2001/13685* (2013.01); *G09G 3/3677* (2013.01); *G09G 2310/0286* (2013.01)

(58) Field of Classification Search
CPC .................. G02F 1/136209; G02F 1/133512; G02F 1/136227; G02F 1/136213; G02F 1/136286; G02F 2001/133388; G02F 1/1339; G02F 1/133514; G09G 2300/0842; G09G 2300/0819; G09G 3/3233; G09G 3/3648; G09G 3/3614
USPC .................... 349/44, 110; 345/80, 90
See application file for complete search history.

(56) References Cited

U.S. PATENT DOCUMENTS

| | | | |
|---|---|---|---|
| 6,556,265 B1 * | 4/2003 | Murade ............ | G02F 1/136213 349/110 |
| 2002/0175888 A1 * | 11/2002 | Murade ............... | G02F 1/13454 345/92 |
| 2003/0025659 A1 | 2/2003 | Kondo et al. | |

(Continued)

FOREIGN PATENT DOCUMENTS

| | | |
|---|---|---|
| JP | 02-015676 | 1/1990 |
| JP | 06-202160 | 7/1994 |

(Continued)

*Primary Examiner* — Mike Qi
(74) *Attorney, Agent, or Firm* — Young & Thompson

(57) ABSTRACT

A liquid crystal display unit includes: an insulating substrate; a counter insulating substrate; a liquid crystal put between the insulating substrate and the counter insulating substrate; a pixel matrix including plural pixels; and a peripheral circuit including a control section and an output section, for driving a gate line of a pixel TFT in each of the pixels. The pixel matrix and the peripheral circuit are integrally formed above the insulating substrate such that the output section is located closer to the pixel matrix than the control section. The liquid crystal display unit further comprises a light shielding metal disposed at an insulating-substrate side of the pixel TFT in each pixel, and a light shielding metal disposed at an insulating-substrate side of each TFT at least in the output section among TFTs in the peripheral circuit.

7 Claims, 10 Drawing Sheets

(56) References Cited

U.S. PATENT DOCUMENTS

2006/0132665 A1* 6/2006 Park ............... G02F 1/1368
349/28
2006/0262074 A1* 11/2006 Shimoda ............ G11C 19/28
345/100

FOREIGN PATENT DOCUMENTS

| JP | 2006-351165 | 12/2006 |
|----|-------------|---------|
| JP | 2008-165029 | 7/2008  |

* cited by examiner

LIQUID CRYSTAL DISPLAY UNIT

TECHNICAL FIELD

The present invention relates to a liquid crystal display unit, and in particular, to a structure of a liquid crystal display unit in which a drive circuit and a pixel matrix are integrated in one body.

BACKGROUND

Liquid crystal display units used for certain applications such as projectors (PJ) and head-up displays (HUD) are requested to have a small display size, in order to make the size of expensive optical components, such as a lens and a prism, smaller. Simultaneously, such liquid crystal display units are further requested to cope with image quality deterioration due to irradiation of light since those liquid crystal display units are irradiated with extremely strong light for a purpose of forming a bright image. In order to respond to the above requests, many of the liquid crystal display units used for the above applications are manufactured by a polycrystalline-silicon thin-film transistor process or a poly-Si TFT process. As the reasons, the following points may be assumed. First, poly-Si TFTs have a field-effect mobility larger by 100 or more times than that of amorphous-silicon thin-film transistors (a-Si TFTs). Constituting a peripheral circuit of a liquid crystal display unit by using poly-Si TFTs can make the liquid crystal display unit small. Further, poly-Si TFTs have light sensitivity lower than that of a-Si TFTs. Accordingly, poly-Si TFTs are not likely to cause image quality deterioration due to a light leakage current. Generally, if a light leakage current takes place in a pixel TFT, a pixel voltage tends to fluctuate, which causes lowering of contrast and flicker.

However, even in the case where poly-Si TFTs are used in such liquid crystal display unit, if the poly-Si TFTs are irradiated with light with an illuminance of millions or more lux as in a projector (PJ), a light leakage current in the poly-Si TFTs cannot be ignored. Since the poly-Si TFTs have a planar type structure, a channel section of each TFT is directly irradiated with light via a glass substrate, which may become one of the causes of the light leakage current. In order to cope with the above problem, Japanese Unexamined Patent Application Publications (JP-A) No. H02-15676 proposes a technique to reduce a light leakage current in such TFTs.

FIG. 12 shows a cross-sectional constitution of a poly-Si TFT disclosed in JP-A No. H02-15676. On a TFT substrate 101, a light shielding film 320 made of a high melting point metal or its oxide is disposed beneath a polycrystalline silicon film 340 across an interlayer film 330. Further, a gate insulating film 350, a gate electrode 360, an interlayer film 370 and a wiring metal 380 are formed on the polycrystalline silicon film 340. In a pixel section using a TFT having the above structure, a TFT channel section beneath a gate electrode 360 is not irradiated directly with light from the TFT substrate 101 side, whereby it becomes possible to reduce a light leakage current in a TFT greatly. The above structure is mainly applied to TFTs in a pixel section, and is not applied to TFTs in a peripheral circuit section. This is because a light shielding film which is disposed beneath a TFT channel section and has conductivity can cause fluctuation in the threshold voltage of the corresponding TFT. In a TFT in the pixel section, a voltage applied between a source and a drain is lower than a voltage applied between a source and a gate. Accordingly, even if the above fluctuation of the threshold voltage occurs, the TFT operates normally. On the other hand, in a TFT in the peripheral circuit section, in many cases, a voltage between a source and a drain and a voltage between a gate and a source are equal to each other. Accordingly, characteristics of the circuit fluctuate due the fluctuation of the threshold voltage, which causes lowering of the output voltage of the peripheral circuit section and malfunction.

Therefore, for the peripheral circuit section, a method has been proposed so as to shield it from light with a package member. FIG. 13 is a cross-sectional view of a liquid crystal display module for a projector disclosed in JP-A No. H06-202160 (corresponding to US2003/0025659A1). The liquid crystal display module includes a liquid crystal panel composed of a TFT substrate 101, a CF substrate 102, liquid crystal 103 and a sealing member 104, and is structured such that the peripheral portion of the liquid crystal panel is covered with a package member 106 made of a material which does not transmit light, such as a black mold resin or a ceramic. The package member 106 is provided with an opening section 107 through which a pixel matrix 200 can be irradiated with light. On the other hand, a peripheral circuit 105 is arranged at a position covered with the package member 106, whereby the peripheral circuit 105 is not affected by light.

Although the problem caused by a light leakage current of a TFT is improved by the above-mentioned method, another problem arises in that the cost of a liquid crystal display module becomes high. The reason is described below. According to the above-mentioned method, it is necessary to prepare a liquid crystal display module in which a pixel section (pixel matrix) is not covered with a package member and a peripheral circuit is covered with the package member. Therefore, if a distance between the pixel section and the peripheral circuit in the liquid crystal panel is small, it is required to assemble the liquid crystal panel and the package member with extremely high accuracy. However, the outside dimension of the liquid crystal panel includes a tolerance in a cutting process, and the dimension of the package member also includes a tolerance. Furthermore, a tolerance takes place also in a process of superposing the liquid crystal panel and the package member. Each of the above tolerances is about 0.2 mm to 0.5 mm. In order to surely prepare a structure that the pixel section is not covered with the package member and the peripheral circuit is covered with the package member, each of the distance M1 and the distance M2 in FIG. 13 is required to have a value equal to or larger than the total of the above tolerances, and each of the distances M1 and M2 usually becomes about 1 mm, where M2 represents a distance from an edge of the pixel matrix 200 to an edge of the opening section 107 of the package member 106, M1 represents a distance from an edge of the opening section 107 of the package member 106 to an edge of the peripheral circuit 105. Accordingly, a necessary distance from the edge of the pixel matrix 200 to the edge of the peripheral circuit 105 becomes about 2 mm. In a liquid crystal panel including peripheral circuits 105 arranged at both sides of the pixel matrix 200, functionless areas extending over a total length of 4 mm need to be secured, which enlarges the liquid crystal panel. If the external shape of a liquid crystal panel becomes large, the number of substrates of liquid crystal panels which can be laid out in one mother substrate decreases. Therefore, especially, in the case of a liquid crystal panel for a head-up display, whose display area has a diagonal dimension being about 2 inches and is larger than that of a liquid crystal display unit for a projector, the reduction of the number of substrates which can be laid out in one mother substrate becomes extremely large, which increases cost.

As a method of solving the above problems, the method disclosed by JP-A No. 2008-165029 may be used. In this method, a light shielding film is arranged for each of TFTs in a pixel section and TFTs in a peripheral circuit, wherein an earth potential is applied to the light shielding film for each TFT in the pixel section and a gate potential is applied to the light shielding film for each TFT in the peripheral circuit. According to this method, there is no need to surely cover the peripheral circuit with a light shielding package member, and a panel size can be made small.

Further, as a technique to lower the cost of a liquid crystal display unit, for example, as disclosed by JP-A No. 2006-351165 (corresponding to US2006/0262074A1), a method of forming TFTs in a pixel section and TFTs in a peripheral circuit to be poly-Si TFTs of a single conductivity type may be used. FIG. 14 shows a circuit diagram of a gate driver constituted by p-type poly-Si TFTs, which is disclosed in JP-A No. 2006-351165, where Tr1 to Tr8 represent transistors, IN represents input signal, OUT represents output signal, CL1 and CL2 represent clock signal, RST represents reset signal, VDD represents a power source, VSS represent the ground, and N represents a node.

In the case where the light shielding method for TFTs disclosed in JP-A No. 2008-165029 is combined with the method of constituting a peripheral circuit with poly-Si TFTs of a single conductivity type disclosed in JP-A No. 2006-351165, an area necessary for forming a peripheral circuit increases greatly. As a result, it turns out by the inventor's investigation that the panel size is hardly miniaturized. The reasons are described below.

In the method disclosed in JP-A No. 2008-165029, a light shielding film disposed beneath each TFT constituting the peripheral circuit is needed to be provided with the same electric potential with a gate electrode of the corresponding TFT. In an example of the circuit shown in FIG. 14, eight TFTs are used in one block constituting a scanning circuit, where a gate-electrode electric potential is common to both of TFTs Tr1 and Tr2, a gate-electrode electric potential is common to both of TFTs Tr3 and Tr4, and similarly, a gate-electrode electric potential is common to both of TFTs Tr7 and Tr8. In consideration of the above situations, the light shielding films are provided as at least five separated island-shaped films each independent electrically from the others. FIG. 15 is a layout diagram showing a single TFT including a contact hole 325 adapted to connect a gate electrode 360 and a light shielding film 320, and FIG. 16 shows a cross-sectional view taken along the line XVI-XVI in FIG. 15. In FIGS. 15 and 16, 101 represents a TFT substrate, 330 and 370 represent interlayer films, 340 represents a polycrystalline silicon film, 350 represents a gate insulating film, 360 represents a gate electrode, and 380 represents wiring metal. In the example shown in here, the light shielding film 320 is electrically connected with the gate electrode 360 through the contact hole 325 which penetrates the interlayer film 330 and the gate insulating film 350. That is, it is necessary to form such a contact hole 325 in each of the light shielding films being the five separated island-shaped films. Accordingly, an area needed to constitute the circuit increases greatly. Since a gate driver for one block is needed to be arranged within the same width as a pixel pitch, an amount of an increase in a circuit area becomes appreciably larger in a liquid crystal display unit with a small pixel pitch.

Further, in a liquid crystal panel in which the circuit is constituted with TFTs of a single conductivity type, a bootstrap method is used such that the amplitude of an output voltage may become equal to a power source voltage. In the circuit shown in FIG. 14, the gate potential of TFT Tr7 is lowered by the bootstrap method (in the case of using p-type TFTs), and it operates such that the amplitude of output signal OUT becomes equal to the voltage between power sources VDD and VSS. If describing a little in more detail, in the bootstrap method, first, the electric potential of a node N connected to the gate of TFT Tr7 is made to an electric potential to make TFT Tr7 become a conduction state. Thereafter, the node N is made into a floating state, and clock signal CL1 transits to a low level, whereby the electric potential of the node N lowers together with an electric potential change of a source potential (OUT) by a capacitive coupling between a source and a gate of TFT Tr7. Here, if the method disclosed in JP-A No. 2008-165029 is applied to this circuit, a light shielding film which overlaps with the source and drain regions of TFT Tr7 in a planar view is disposed beneath the TFT Tr7, and the light shielding film is connected to a gate electrode electrically. Accordingly, the parasitic capacitance of the node N becomes extremely large. This is because TFTs Tr6 and Tr7 are constituted to form an output section in this circuit and the channel width of TFT Tr7 is set to become extremely large in order to charge and discharge a gate line of a pixel region serving as a load within a given time period. If the parasitic capacitance of the node N is large, it takes a long time to provide the node N with an electric potential to make TFT Tr7 to a conduction state. Accordingly, another problem arises in that a high speed operation cannot be performed. Even if the peripheral circuit is constitute with n-type TFTs, these problems occur similarly.

The present invention seeks to solve the problems.

SUMMARY

In view of the above-described problems, there are provided illustrative liquid crystal display units as embodiments of the present invention. In such liquid crystal display units, a peripheral circuit constituted with TFTs is formed integrally together with pixels in one body on the same substrate, and the liquid crystal display units are irradiated with extremely strong light from a light source. The illustrative liquid crystal display units provide a structure which does not cause operational failures of the peripheral circuit due to strong light, makes the size of a liquid crystal panel small, and can realize a reduced cost.

An illustrative liquid crystal display unit relating to one aspect of the present invention comprises: an insulating substrate; a counter insulating substrate facing the insulating substrate; and a liquid crystal put between the insulating substrate and the counter insulating substrate. The liquid crystal display unit further comprises a pixel matrix including a plurality of pixels each including a pixel capacitor and a pixel TFT; and a peripheral circuit including a control section and an output section, for driving a gate line of the pixel TFT in each of the pixels, where each of the control section and the output section includes TFTs. The pixel matrix and the peripheral circuit are integrally formed in one body and formed on the insulating substrate, where the output section is located closer to the pixel matrix than the control section when being viewed from a normal direction of the insulating substrate. The pixel TFTs of the pixels and the TFTs in the peripheral circuit have a top-gate structure. The liquid crystal display unit further comprises a light shielding metal (or a light shielding film) disposed at an insulating-substrate side of the pixel TFT in each of the pixels, and a light shielding metal disposed at an insulating-substrate side of each of the TFTs at least in the output section among the TFTs in the peripheral circuit. Optionally, the control section may include a TFT at the insulating-substrate side of which a light shielding metal is not disposed.

In the illustrative liquid crystal display unit, the TFTs in the peripheral circuit may be TFTs of a same conductivity type. The TFTs in the output section may include a first TFT whose gate voltage is to be stepped up or stepped down by a bootstrap method, and the light shielding metal formed at the insulating-substrate side of the first TFT may have a same electric potential as an electric potential of an output terminal of the output section.

In the illustrative liquid crystal display unit, the TFTs in the peripheral circuit may include a second TFT at the insulating-substrate side of which a light shielding metal is disposed, where the second TFT is different from the first TFT. The light shielding metal disposed at the insulating-substrate side of the second TFT may have a same electric potential as that of a source electrode of the second TFT.

The illustrative liquid crystal display unit may further comprise a package member made of a material which does not transmit light, wherein the package member covers the insulating substrate and the counter insulating substrate, and includes an opening section formed thereon. Further, an edge surface of the opening section may overlap with the output section when being viewed from the normal direction of the insulating substrate. Further, the edge surface of the opening section may be located in the middle of a pixel-matrix-side edge of the control section and a peripheral-circuit-side edge of the pixel matrix when being viewed from a normal direction of the insulating substrate.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DETAILED DESCRIPTION

Illustrative liquid crystal display units will be described below as embodiments of the present invention with reference to the drawings. It will be appreciated by those of ordinary skill in the art that the description given herein with respect to those figures is for exemplary purposes only and is not intended in any way to limit the scope of potential embodiments may be resolved by referring to the appended claims.

The illustrative liquid crystal display unit is prevented from occurrence of image quality deterioration and malfunction of a gate driver integrally formed with pixels on a TFT substrate even if the liquid crystal display unit is irradiated with extremely strong light.

Further, in the illustrative liquid crystal display units, it becomes possible to realize to use a liquid crystal panel with a small dimension, and the cost can be made low.

Next, description is given in detail to one embodiment of the present invention with reference to the drawings. A size and a scale for each constitutional component of each of the drawings are appropriately adjusted in order to secure the visibility of the drawings.

Figure 1:
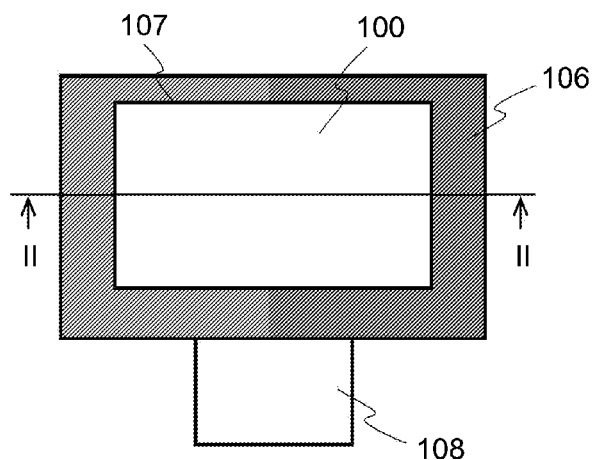
FIG. 1 is a plan view illustrating the structure of a liquid crystal display unit pertaining to one embodiment of the present invention.
Figure 2:
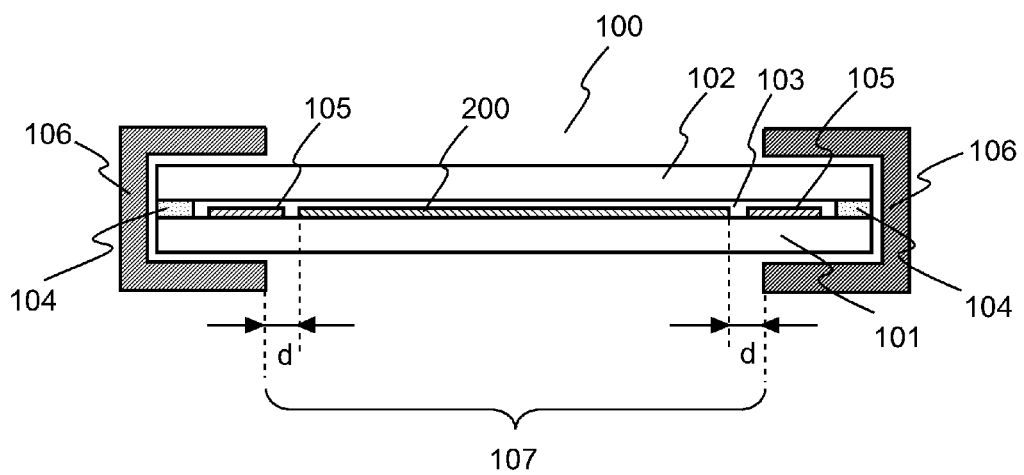
FIG. 2 is a cross-sectional view illustrating the structure of a liquid crystal display unit pertaining to one embodiment of the present invention.

FIG. 1 is a plan view illustrating a structure of a liquid crystal display unit pertaining to the present embodiment. This liquid crystal display unit has a constitution in which a liquid crystal panel 100 including two facing insulating substrates is covered with a package member 106 made of a material which does not transmit light substantially. The package member 106 includes an opening section 107 where a display section of the liquid crystal panel 100 is not covered and is exposed. To the liquid crystal panel 100, a flexible board 108 for supplying drive signals from an external device or component is connected. FIG. 2 is a cross-sectional view illustrating a cross-sectional structure taken along the line II-II in FIG. 1. The liquid crystal panel 100 has a constitution in which a TFT substrate 101 and a CF substrate 102 are superimposed on each other. In the TFT substrate 101, TFTs are formed on an insulating substrate, such as a glass substrate, and, in the CF substrate 102, color filters (CF) are formed on another insulating substrate, such as a glass substrate. A liquid crystal 103 is put and sealed in a space surrounded by the TFT substrate 101, the CF substrate 102, and a sealing member 104 which pastes the TFT substrate 101 and the CF substrate 102 together. On the TFT substrate 101, there are formed a pixel matrix 200 and a peripheral circuit 105 each including TFTs, where the pixel matrix 200 includes plural pixels arranged in matrix, and the peripheral circuit 105 is configured to drive the pixel matrix 200, especially a gate line of the pixel TFT in each pixel. The pixel matrix 200 is located at a position of the opening section 107 of the package member 106, and is not hidden by the package member 106. When being viewed from the normal direction of the TFT substrate 101, there is a distance "d" between the edge of the pixel matrix 200 and the edge of the opening section 107 of the package member 106.

Although the peripheral circuit 105 is arranged on two sides of the pixel matrix 200 in the example shown in FIG. 2, the peripheral circuit 105 may be arranged at only one side. Further, the sealing member 104 may be arranged at a position where the sealing member 104 is made to overlap with the peripheral circuit 105 in a planar view, or at a position between the pixel matrix 200 and the peripheral circuit 105. Furthermore, in the case where the liquid crystal panel itself is not requested to have a function to select color, it is needless to say that there is no need to provide a color filter to the CF substrate 102.

Figure 3:
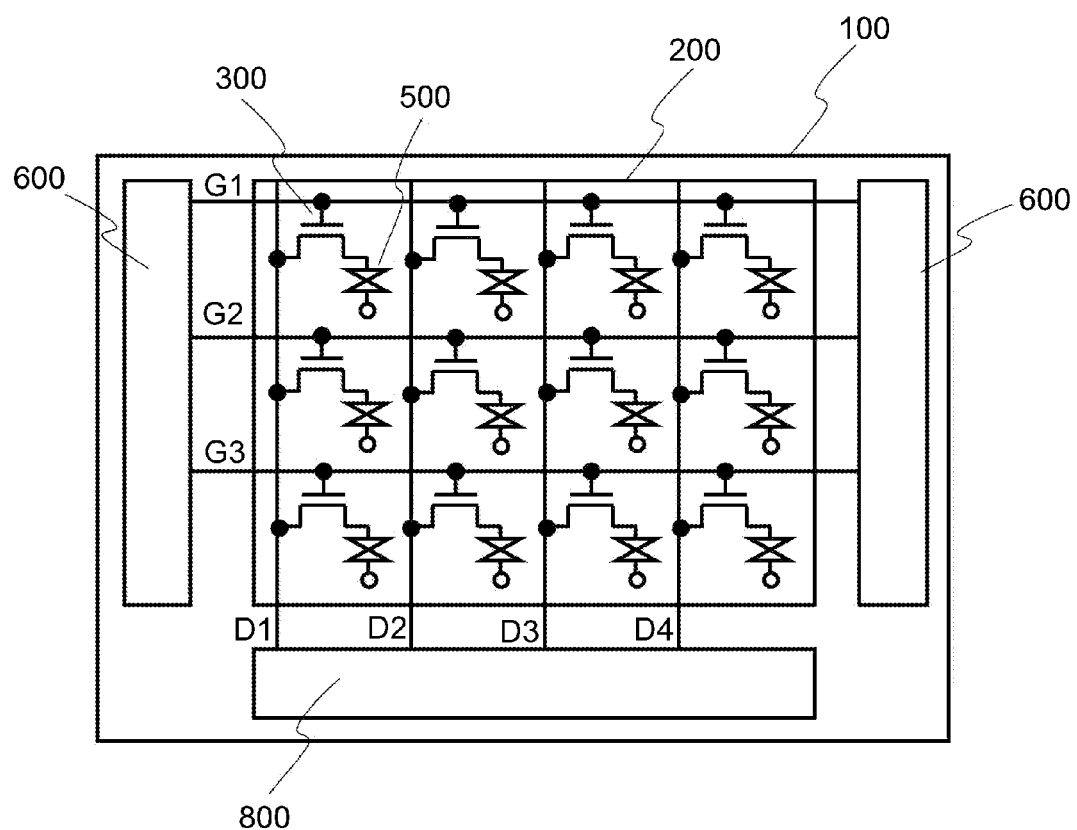
FIG. 3 is a block diagram illustrating the constitution of a liquid crystal display unit pertaining to one embodiment of the present invention.

FIG. 3 is a block diagram showing a constitution of the liquid crystal panel 100. The liquid crystal panel 100 includes a pixel matrix 200, gate drivers 600 being peripheral circuits, and a data driver 800. The pixel matrix 200 includes a matrix of pixels each including at least a pixel TFT 300 and a pixel capacitor 500. Each of the gate drivers 600 serves as a peripheral circuit to drive gate lines (G1-G3) connected to the respective gate terminals of the pixel TFTs 300. The data driver 800 drives data lines (D1-D4) connected to the respective drain terminals of the pixel TFTs 300. The gate driver 600 is constituted with TFTs, and the data driver 800 is constituted with TFTs or ICs made of a crystalline Si. The pixel TFTs 300 and TFTs constituting at least the gate driver 600 are poly-Si TFTs of a single and same conductivity type. The gate driver 600 can employ the structure illustrated in FIG. 4.

Figure 4:
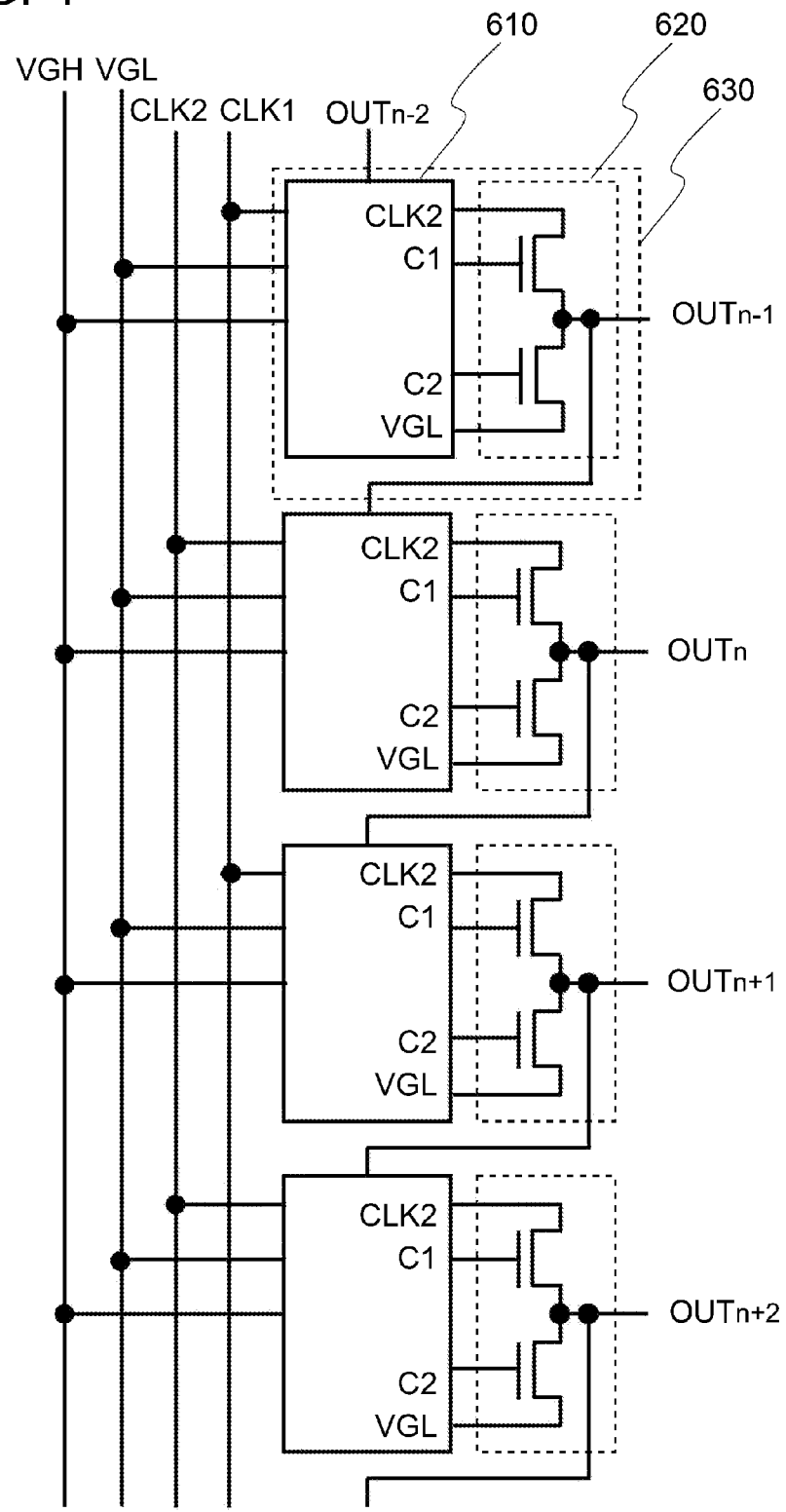
FIG. 4 is a block diagram illustrating the constitution of a gate driver applicable to a liquid crystal display unit pertaining to one embodiment of the present invention.

The circuit illustrated in FIG. 4 is driven by using two phase clocks CLK1 and CLK2, power sources VGH and VGL and a non-illustrated start signal. The gate driver 600 has a constitution in which blocks 630 each including a control section 610 and an output section 620 are connected in series, and is configured to transfer a start signal sequentially to the next block in synchronization with clocks CLK1 and CLK2. The outputs ($OUT_{n-1}$ to $OUT_{n+2}$) of the blocks 630 are connected to the respective different gate lines of the pixel matrix 200. Accordingly, the number of the blocks 630 of the gate driver 600 is made equal to or larger than the number of the gate lines of the pixel matrix 200. FIG. 4 shows circuits of four blocks. For example, in the case where the block with an output indicated with $OUT_{n-1}$ is a block of the first stage, a start signal is supplied to a terminal indicated with $OUT_{n-2}$ in FIG. 4. The output section 620 is constituted with at least two TFTs. Although FIG. 4 shows an example where the output section 620 is constituted with n-type TFTs, it may be constituted with p-type TFTs.

Figure 5:
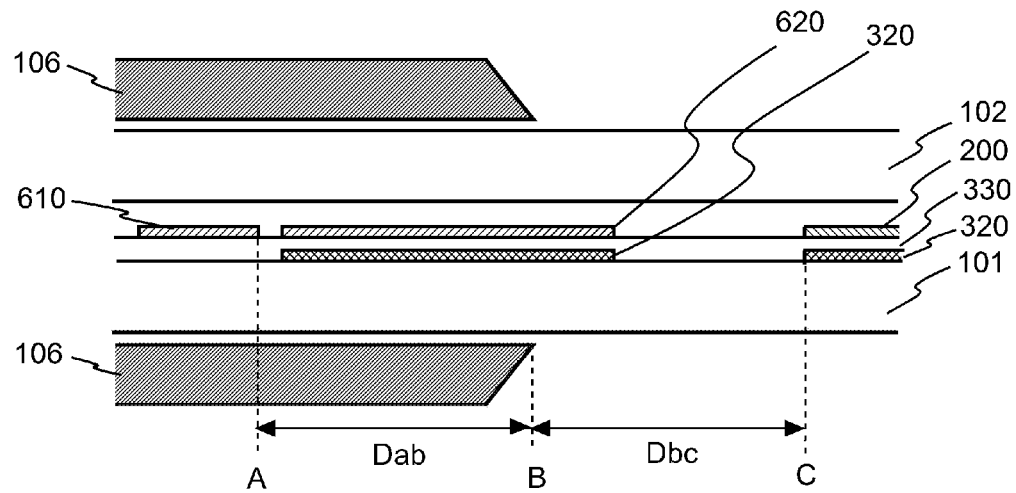
FIG. 5 is a cross-sectional view illustrating the structure of a liquid crystal display unit pertaining to one embodiment of the present invention.

FIG. 5 illustrates a cross section in the vicinity of an edge B of the opening section 107 of the package member 106 of the liquid crystal display unit. Beneath (referred to as at a lower side, at a TFT substrate 101 side, or at a back-channel side) each of the pixel TFTs of the pixel matrix 200 and TFTs constituting the output section 620 of the gate driver 600, a light shielding film 320 (or a light shielding metal) is disposed at a position where the light shielding film 320 overlaps with (or hides) at least a channel section of a corresponding one of the TFTs in a planar view (namely, when viewed from the normal direction of the TFT substrate 101). The TFTs which constitute the control sections 610 include a TFT or TFTs at the TFT-substrate side of which the light shielding film 320 is not disposed. The light shielding film 320 disposed beneath each of the TFTs which constitute the output section 620 is made electrically independent of other components in the other blocks 630 of the gate driver 600, and is connected electrically to the output terminal of the corresponding one of the blocks 630. The light shielding film 320 disposed beneath each of the pixel TFTs may be made in the state of electrically floating, or in the state of being provided with the same electrical potential with gate lines. Further, the output section 620 of the gate driver 600 is arranged between the pixel matrix 200 and the control section 610. Then, an edge surface of the opening section the package member 106 overlaps with the output section 620 when being viewed from the normal direction of the TFT substrate 101, where the edge surface of the opening section is located in the middle of a pixel-matrix-side edge of the control section 610 and a peripheral-circuit-side edge of the pixel matrix 200. Concretely, the edge B of the opening section of the package member 106 is set to be disposed between the edge A near to the pixel matrix 200 among the edges of the control section 610 and an edge C near to the output section 620 among the edges of the pixel matrix 200. The value of each of a distance Dab between the edge A and the edge B and a distance Dbc between the edge B and the edge C is made a value near to the total value of the dimension accuracy of the outer shape of the liquid crystal panel 100, the dimension accuracy of the package member 106, and the position accuracy at the time of incorporating the liquid crystal panel 100 into the package member 106.

The above-described structure of the liquid crystal display unit of the present embodiment, enables to realize a liquid crystal display unit by using a liquid crystal panel with a small dimension, where the liquid crystal display unit does not cause image quality deterioration and malfunction of the gate driver circuit constituted with TFTs even under the condition that the liquid crystal display unit is irradiated with extremely strong light. The reasons for it are described below.

If a liquid crystal display unit in which a TFT is disposed in each pixel is irradiated with extremely strong light, a leakage current due to light flows through the pixel TFT, and a voltage held in the pixel capacitor fluctuates. This voltage fluctuation may cause flicker, crosstalk occur or lowering of contrast. However, in the structure of the present embodiment, since a light shielding film is disposed at the back-channel side (the TFT-substrate side) of each of the pixel TFTs, the channel section is not irradiated with light directly. Accordingly, it becomes possible to reduce leakage currents due to light greatly, thereby preventing degradation of image quality.

Further, if TFTs constituting a gate driver are irradiated with extremely strong light, a light leakage current flows through the TFTs constituting the circuit. Accordingly, an electric potential in the circuit may fluctuate, which may cause malfunction. However, in the liquid crystal display unit of the present embodiment, the control section 610 of the gate driver is shielded from light by the package member 106 and the output section 620 is shielded from light by the light shielding film 320. Accordingly, the TFTs constituting the gate driver are not irradiated with light directly. Therefore, malfunction due to a light leakage current does not occur.

Furthermore, if an interlayer film 330 between a light shielding film 320 and the polycrystalline silicon film of a TFT constituting the output section 620 is made thinner, the threshold voltage of the TFT fluctuates due to the influence of the light shielding film 320. For example, in the case that n-type TFTs are used, with a change of the electric potential of the light shielding film 320 to be larger as compared with the electric potential of the source electrode of the TFT, the threshold voltage of the TFT changes so as to become small. With the change of the electric potential of the light shielding film 320 in the opposite direction, the threshold voltage changes so as to become large. In a gate driver constituted with only TFTs of a single conductivity type, there may be a case where the electric potential of each of the drain electrode and the source electrode of the TFT changes more than the range of an electric source voltage. Accordingly, in the case where the light shielding film 320 is made in a state of floating, the electric potential of the light shielding film 320 fluctuates greatly due to the capacitive coupling with a drain electrode, and the threshold voltage of the TFT also fluctuates greatly, which may cause malfunction. However, in the constitution of the present embodiment, since the control section 610 is not directly irradiated with light, there is no need to dispose the light shielding film 320 for each TFT in the control section 610, and a threshold fluctuation does not occur. Further, in the TFTs constituting the output section 620, since the same voltage as that at the output terminal is applied to the light shielding film 320, the amount of fluctuation of the threshold voltage can be controlled.

In the circuit illustrated in FIG. 4, since n-type TFTs are used, one of the TFTs constituting the output section 620 is adapted to output a high-level pulse one time during one flame period being a writing period during which the liquid crystal display unit writes in video signals with the number corresponding to one screen, and another one of the TFTs is adapted to perform an operation to output a low-level voltage other than a period to output a pulse. In the structure of the present embodiment, since the electric potential of the light shielding film 320 is made the same with the electric potential of the output terminal, in a period to output a high-level pulse, with an increase of the output voltage, the electric potential of the light shielding film also becomes high and the threshold voltage of the TFT becomes small, which can make a rise time of the electric potential shortened. In a period during which the output becomes a low level, the electric potential of the light shielding film becomes low, the threshold voltage of the TFT becomes high, but a voltage between the gate and the source necessary for outputting a low level is not large. Therefore, it is possible to actuate the TFT sufficiently even if the threshold voltage becomes high. Further, if the amount of fluctuation of the threshold voltage due to the electric potential of the light shielding film has been evaluated beforehand, even in the case where the threshold voltage fluctuates, it becomes possible to cope with the fluctuation by setting a power source voltage to a value capable of outputting a low-level voltage sufficiently. Furthermore, although the light shielding film is made to have a parasitic capacitance between it and each of the channel section, the source electrode, and the drain electrode of the TFT, the channel width of the TFT constituting the output section 620 is set to a large size enough to drive gate lines. It makes possible for the light shielding film to charge and discharge the parasitic capacitance thereof within a short time. Accordingly, the highest operation frequency of the circuit is not restricted.

In the case where the gate driver is shielded from light by the package member, the size of the liquid crystal panel becomes large. As a result, the cost of the liquid crystal display unit becomes high. The reasons why the size of the liquid crystal panel is needed to be made large, are as follows. That is, even if a tolerance takes place on the outer figure of a liquid crystal panel, the dimension of the package member, the positional accuracy at the time of incorporating the liquid crystal panel into the package member, and the like, the gate driver is required to be covered always with the package member and the pixel matrix is required to be not covered always with the package member. In order to attain the above requirements, it is necessary to set each of a distance between an edge of the opening section of the package member and an edge of the gate driver and a distance between an edge of the opening section of the package member and an edge of the pixel matrix to a value near to the total value of the above tolerances. Usually, since the total value of those tolerances becomes about 1 mm, there is a need to provide functionless areas extending over a length of about 2 mm in total at a position between the pixel matrix and the gate driver. Accordingly, since the size of the liquid crystal panel becomes large in proportion to the length of the functionless areas, the number of liquid crystal panels capable of being laid out on a single mother substrate decreases. As a result, the cost becomes high. However, in the liquid crystal display unit of the present embodiment, a light shielding film is disposed for each TFTs constituting the output section in the gate driver, and the output section is arranged at a middle position between the control section and the pixel matrix.

Moreover, in the area of the circuit section constituting the gate driver, an area for arranging the TFTs constituting the output section becomes the largest. The reason is that since there is a need to charge and discharge the gate lines becoming a load within a certain given time, the channel width of the TFTs constituting the output section becomes extremely large as compared with others. If an example is shown, in the case where a liquid crystal display unit with pixels of VGA resolution (640×480) is driven with a frame frequency (the inverse number of one frame period) of 60 Hz, when the channel width of the TFTs of the control section is 5 µm, the channel section of the TFTs of the output section may become 500 µm. Of course, the channel width of a TFT changes depending on the characteristic of the TFT and a device structure to determine the parasitic capacitance of the gate line. However, the situation that the channel width of the TFTs of the output section becomes large remarkably as compared with others, does not change. In the liquid crystal display unit of the present embodiment, since a light shielding film is disposed for each TFT at least in the output section, there is no need to cover the output section with the package member. Since this output section can be arranged at a position between the pixel matrix and the control section, it becomes possible to make the size of the liquid crystal panel small in proportion to an area for disposing at least the circuit of the output section. As the number of pixels increases, the size of the TFTs of the output section is required to be made large. Further, the blocks of the gate driver need to be disposed within the width of a pixel pitch. Accordingly, as a pixel pitch becomes smaller, the length to arrange a circuit becomes longer. Therefore, the higher, the definition of a liquid crystal display unit is, the larger, this effect becomes.

Examples

Figure 6:
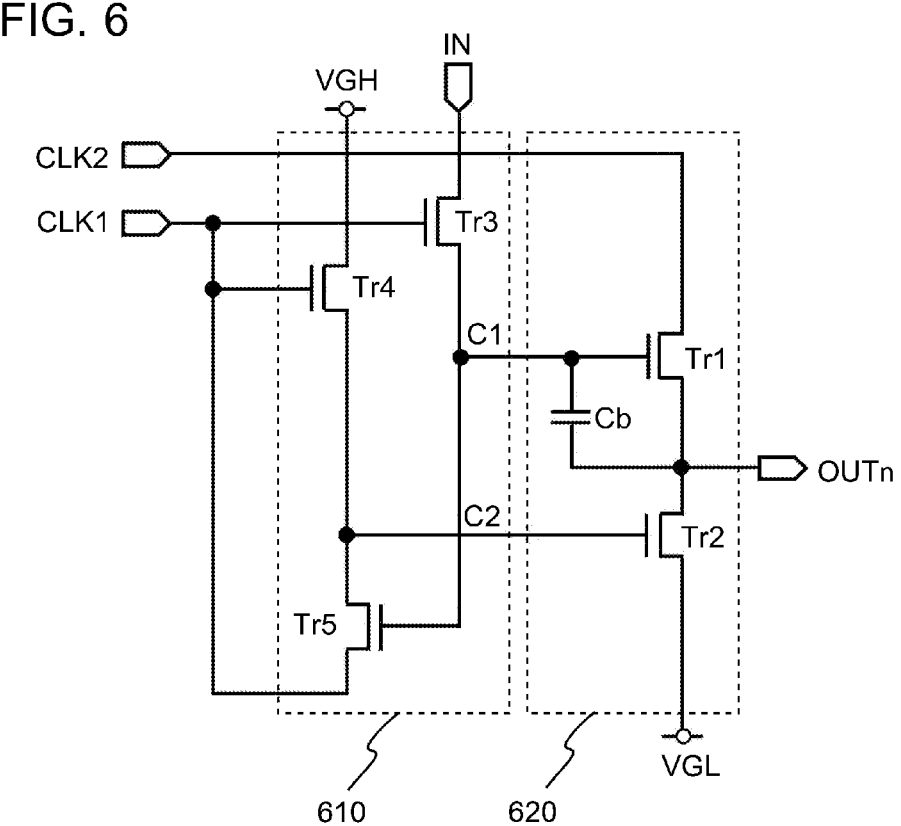
FIG. 6 is a circuit diagram illustrating the constitution of a gate driver applicable to a liquid crystal display unit pertaining to one example of the present invention.

Description is given to an example of the illustrative liquid crystal display units. FIG. 6 illustrates a circuit diagram corresponding to one block of a gate driver constituted by only the n-type TFTs having been described in the above embodiment. This circuit is driven with two phase clocks CLK1 and CLK2, an input signal IN, and two power sources VGH and VGL. Here, it is determined that VGH is a power source at the higher voltage side and VGL is a power source at the lower voltage side. Further, in the case where a block concerned is the first stage among multiple cascade-connected blocks, an input signal IN for the first stage block is a start signal, and an input signal IN for each of blocks other than the first stage block is an output from a previous stage block. The relationship between clocks connected separately to the control section 610 and the output section 620 changes for each block. In each of the blocks connected separately before and after the block shown in FIG. 6, the clock CLK2 is connected to the control section, and the clock CLK1 is connected to the output section. The amplitude range of each of the clocks CLK1 and CLK2 and the start signal becomes a voltage between those of VGH and VGL.

One block of the gate driver is constituted with a control section 610 and an output section 620, the output section 620 is constituted with two TFTs Tr1 and Tr2, and the control section 610 is constituted with three TFTs Tr3, Tr4, and Tr5. The gate voltage of TFT Tr1 constituting the output section 620 is configured to be stepped up by a bootstrap method so as to become a voltage higher than VGH. The capacitor Cb has a capacitance for the stepping up. However, in the case where a parasitic capacitance between the source and the gate in TFT Tr1 is large enough, there is no need to dispose necessarily the capacitor Cb.

Figure 7:
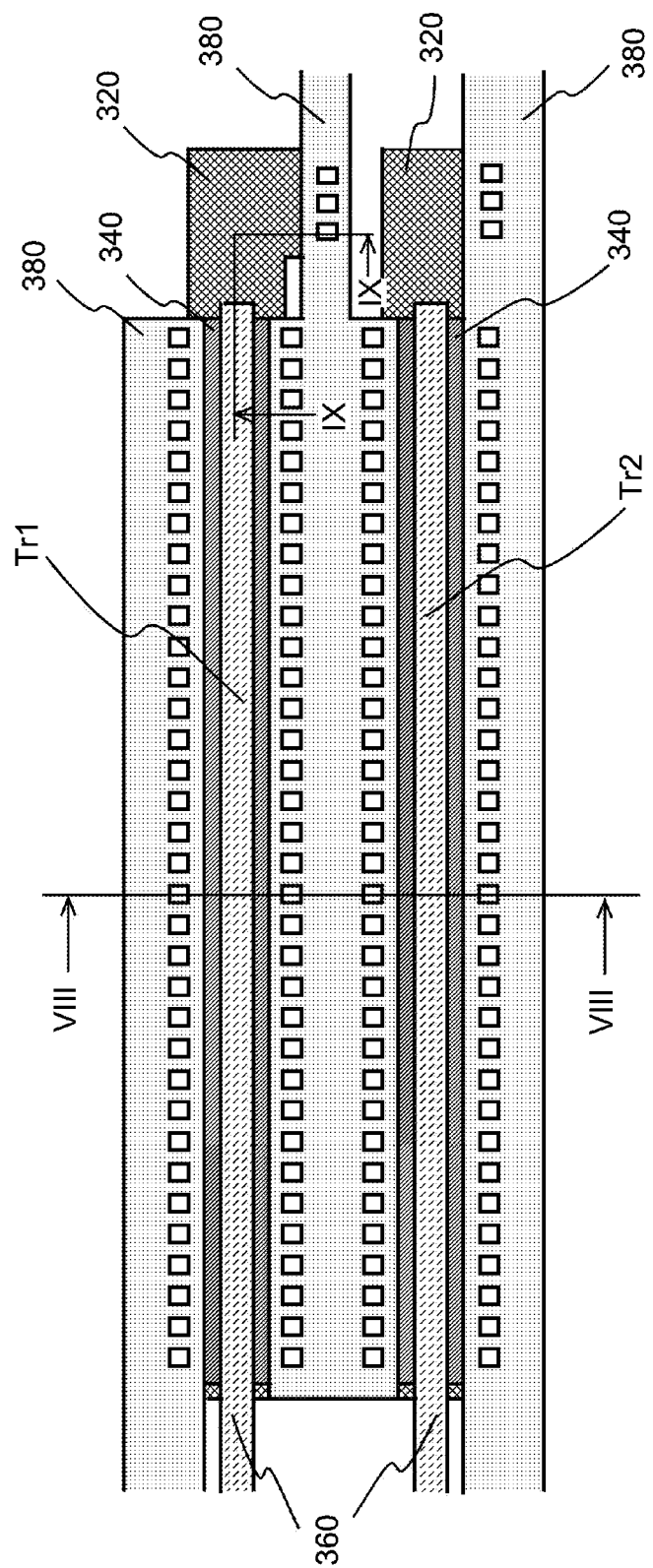
FIG. 7 is a plan view illustrating a layout of a part of a gate driver applicable to a liquid crystal display unit pertaining to one example of the present invention.

As stated in the description of the above embodiment, a light shielding film is disposed beneath each of TFTs Tr1 and Tr2 constituting the output section 620, and the output section 620 is disposed between the control section 610 and the pixel matrix in a planar view. FIG. 7 illustrates a layout of the output section 620, and FIGS. 8 and 9 illustrate the respective cross sections taken along the respective lines VIII-VIII and IX-IX in FIG. 7.

Figure 8:
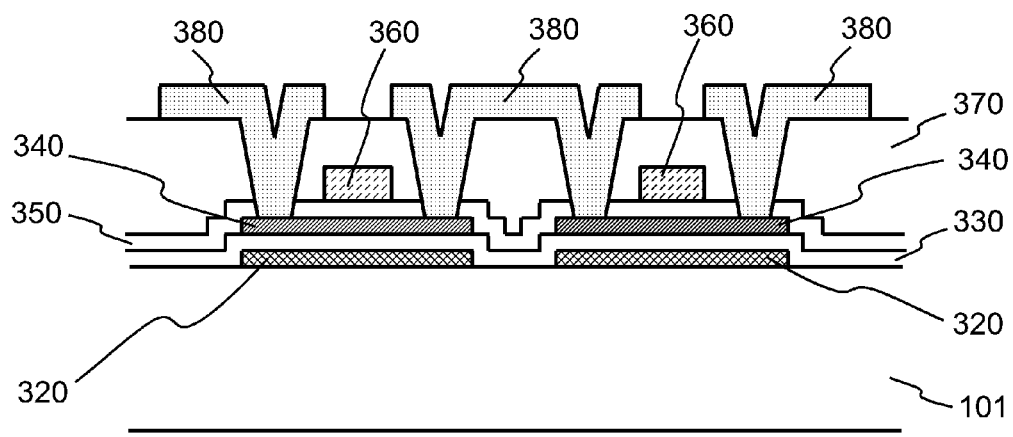
FIG. 8 is a cross-sectional view illustrating the structure of a liquid crystal display unit pertaining to one example of the present invention.
Figure 9:
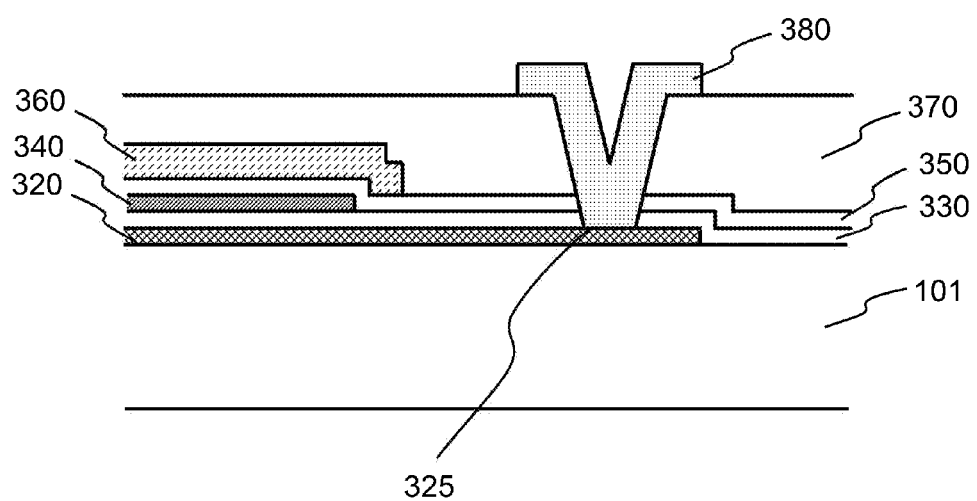
FIG. 9 is a cross-sectional view illustrating the structure of a liquid crystal display unit pertaining to one example of the present invention.
Figure 12:
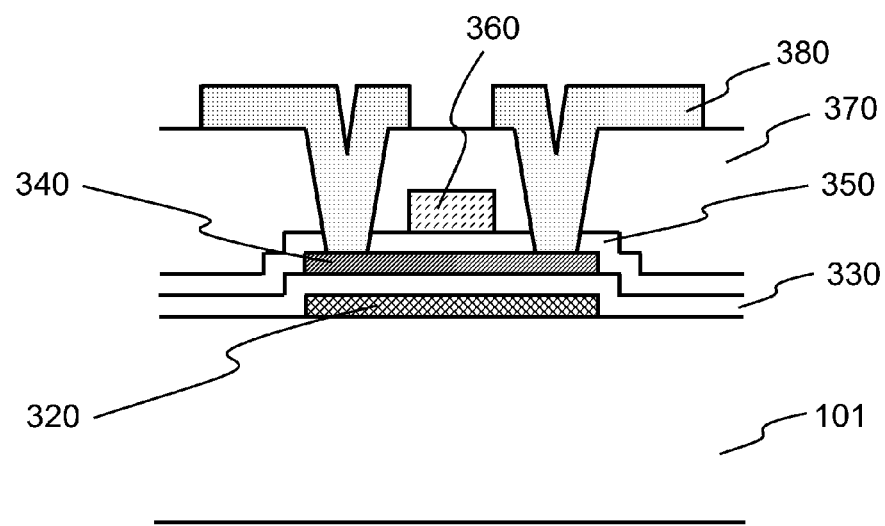
FIG. 12 is a cross-sectional view illustrating the structure of a conventional liquid crystal display unit.
Figure 13:
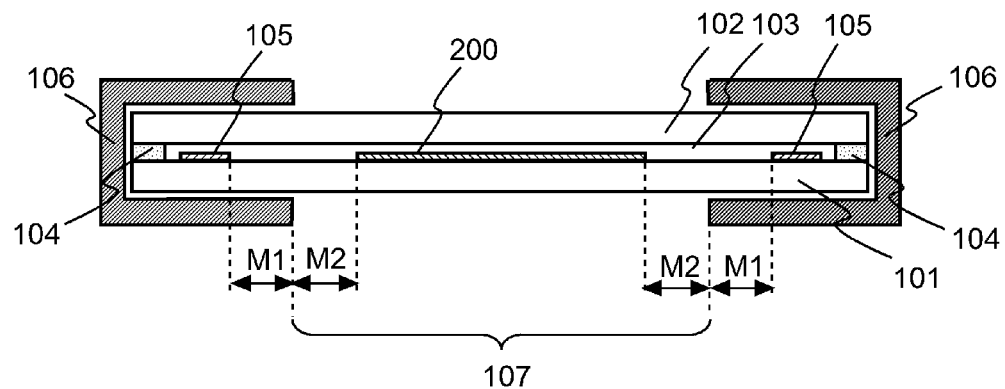
FIG. 13 is a cross-sectional view illustrating the structure of a conventional liquid crystal display unit.
Figure 14:
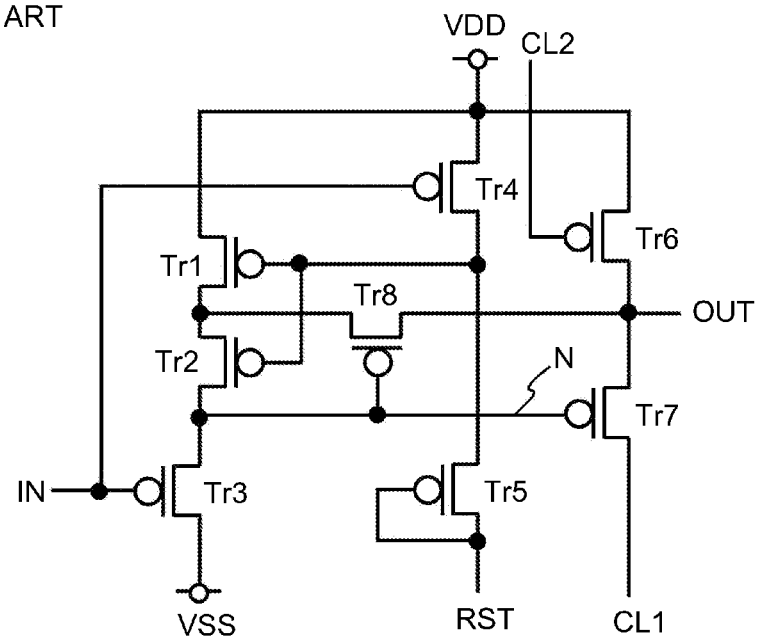
FIG. 14 is a circuit diagram illustrating the constitution of a gate driver of a conventional liquid crystal display unit.
Figure 15:
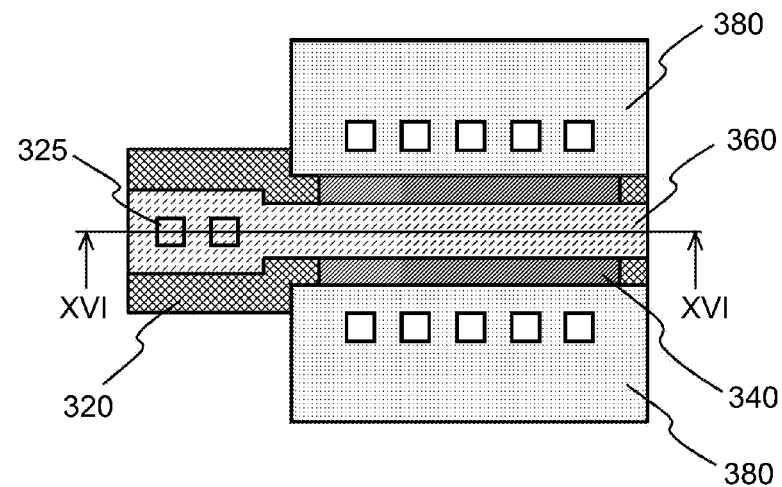
FIG. 15 is a plan view illustrating a layout of a part of a gate driver of a conventional liquid crystal display unit.
Figure 16:
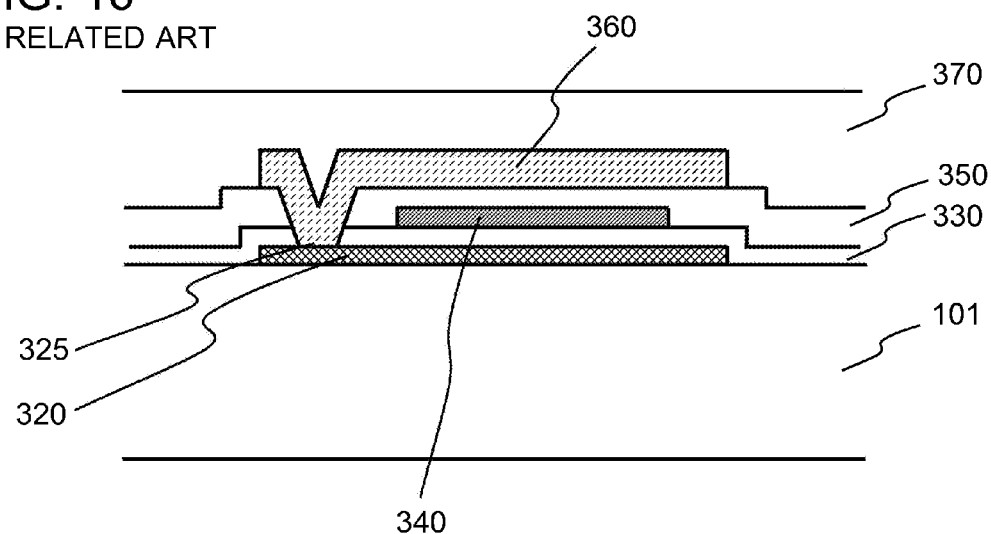
FIG. 16 is a cross-sectional view illustrating the structure of a conventional liquid crystal display unit.

Next, description is given to a cross-sectional structure of the output section 620 with reference to FIG. 8. On a TFT substrate 101 made of a material which has insulation properties such as glass etc. and can transmit light, light shielding films 320 are formed and patterned. For the light shielding films 320, a material with a high melting point, such as W, Cr, Ti, and an alloy containing these metals, may be used. On the light shielding films 320, an interlayer film 330 to be used as a base layer of polycrystalline silicon films is formed. For the interlayer film, a film of $SiO_2$ or $SiN_x$, or a laminated film including layers of those materials may be used. On the interlayer film 330, a polycrystalline silicon films 340 are formed and patterned. The polycrystalline silicon films can be formed by the steps of forming a-Si films and, thereafter, annealing the a-Si films with an excimer laser and the like. On the polycrystalline silicon films 340, a gate insulating film 350 is formed. For the gate insulating film, a film of $SiO_2$ or $SiN_x$, or a laminated film including layers of those materials may be used. On the gate insulating film 350, a layer of gate metal is formed and patterned, thereby forming gate electrodes 360. Examples of the gate metal include Cr, Al, and the like. During a period from the formation of the polycrystalline silicon films 340 to the formation of the gate electrodes 360, a process of injecting impurities into the source and drain region of each TFT, a process of injecting low concentration impurities in order to form a LDD (Lightly Doped Drain) between the source and drain region and a channel forming region of each TFT, a process such as channel dose to control a threshold value, and a process for activation may be performed. On the gate metal layer, an interlayer film 370 is formed. For the interlayer film 370, a film of $SiO_2$ or $SiN_x$, of a laminated film including layers of those materials may be used. On the interlayer film 370, wiring metals 380 are made and patterned. For the wiring metals 380, Al or an alloy containing it may be used. In a pixel matrix region, pixel TFTs with the same structure as that shown in FIG. 12 are formed. Although not illustrated, on the layer of wiring metal 380, interlayer films different from the above-mentioned one, pixel electrodes made of material for transparent electrodes such as ITO (Indium Tin Oxide), and the like are formed. A structure above the wiring metals 380 may be modified appropriately depending on the mode of a liquid crystal. Further, in each TFT, the wiring metal 380 is electrically connected to the source and drain region of the TFT via a contact hole, and in the wiring region, if needed, the wiring metal 380 is also electrically connected with the gate electrode 360 via a contact hole. It is desirable that the size of the light shielding film 320 is made equal to or larger than that of the corresponding polycrystalline silicon film because of the following reasons. That is, it is necessary to make the light shielding film 320 overlap with a region where the gate electrode 360, on which a channel of a TFT is formed, and the polycrystalline silicon film 340 overlap with each other in a planar view. In the case that the TFT has a LDD structure, it is further necessary to make the light shielding film 320 overlap with the LDD region in a planar view. Further, it is necessary for the light shielding film 320 to shield light irradiated to the TFT from an oblique direction. For the TFTs constituting the control section 610, there is no need to necessarily dispose a light shielding film 320 beneath each of the TFTs. That is, the control section 610 can include a TFT employing a structure in FIG. 8 from which the light shielding film 320 is omitted.

In each block in the gate driver, the voltage to be applied to the light shielding film 320 disposed beneath each of the two TFTs constituting the output section 620 is a voltage becoming the same electric potential as that of an output terminal in the corresponding block. However, in order to suppress malfunction surely, it is preferable that the voltage becoming the same electric potential as that of the output terminal is applied to the light shielding film 320 disposed beneath TFT Tr1 (a first TFT in which a gate voltage is stepped up or stepped down by a bootstrap method), and that a voltage becoming the same electric potential as that of the power source VGL (a source electrode of the corresponding TFT) is applied to the light shielding film 320 disposed beneath TFT Tr2 (a second TFT being different from the first TFT in which a gate voltage is stepped up or stepped down by a bootstrap method). Description is given to a structure to provide an electric potential to the light shielding films 320 as stated above with reference to FIG. 9. FIG. 9 illustrates a cross section taken along the line IX-IX in FIG. 7, and shows an electrical connection between the light shielding film 320 of TFT Tr1 and the wiring metal 380 forming the output terminal. On a region where the light shielding film 320 extending from a position beneath TFT Tr1 overlaps with the wiring metal 380 forming the output terminal in a planar view, a contact hole 325 is formed so as to penetrate through the interlayer film 330 used as a base layer, the gate insulating film 350, and the interlayer film 370. The light shielding film 320 and the wiring metal 380 are electrically connected to each other via the contact hole 325. In TFT Tr2, similarly, the light shielding film 320 extending from a position beneath TFT Tr2 is electrically connected via a contact hole to the wiring metal 380 having the same electric potential as that of the power source VGL.

In the pixel matrix 200, the light shielding film 320 disposed beneath each pixel TFT 300 may have a floating structure electrically not connected to any one of wirings, or may be electrically connected so as to have the same electric potential as that of the gate line. However, in a liquid crystal display unit with the large number of pixels, it is preferable that the light shielding film 320 disposed beneath each pixel TFT 300 is made in a floating state, in order to make the parasitic capacitance of the gate line small.

Figure 10:
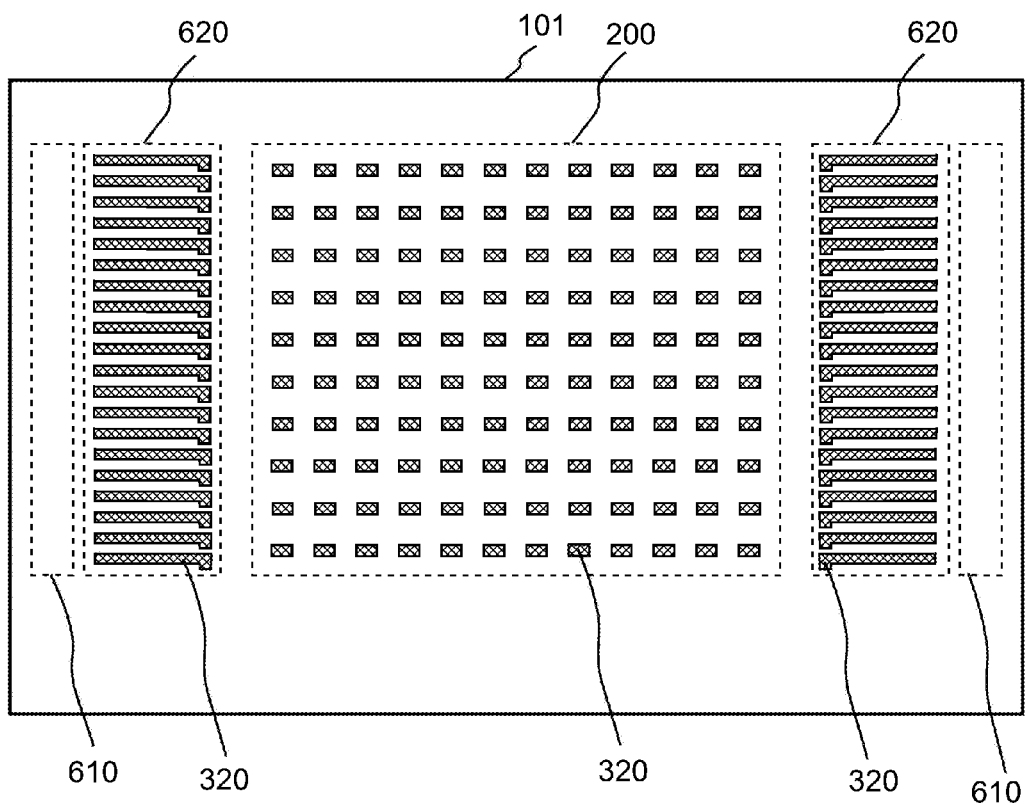
FIG. 10 is a schematic diagram illustrating an arrangement pattern of light shielding films of a liquid crystal display unit pertaining to one example of the present invention.

FIG. 10 schematically shows a pattern of the light shielding films 320 arranged on the TFT substrate 101 of the liquid crystal display unit in the above-described structure. In the pixel matrix 200, the light shielding films 320 are arranged in an isolated pattern such that the isolated light shielding films 320 is disposed at a position beneath a corresponding one of the pixel TFTs 300 and hides a semiconductor layer of the corresponding pixel TFT 300, when being viewed from the normal direction of the TFT substrate 101. Also in the region of the output section 620 constituting the gate driver 600, the light shielding films 320 are arranged in an isolated pattern such that the isolated light shielding film 320 is disposed at a position beneath a corresponding one of the TFTs constituting it and hides a semiconductor layer of the corresponding TFT, when being viewed from the normal direction of the TFT substrate 101. However, in the region of the control section 610, since there is no need to necessarily dispose the light shielding film 320 beneath each TFT, no light shielding films 320 are disposed in the example shown in here. In a structure such that a protective element constituted with TFTs is arranged between the pixel matrix 200 and the output section 620, which is not illustrated, it is preferable to dispose a light shielding film 320 at a position corresponding to the position of each of the TFTs. Further, also in a structure that a protective element constituted with TFTs is arranged on a data line in the vicinity of the pixel matrix 200, it is preferable to dispose a light shielding film 320 at a position corresponding to the position of each of the TFTs. In addition to the protective element, also in a structure that other circuits employing TFTs such as an inspection circuit are arranged at a position irradiated with light through the opening section 107, it is preferable to dispose a light shielding films 320 at a position corresponding to the position of each of the TFTs.

Figure 11:
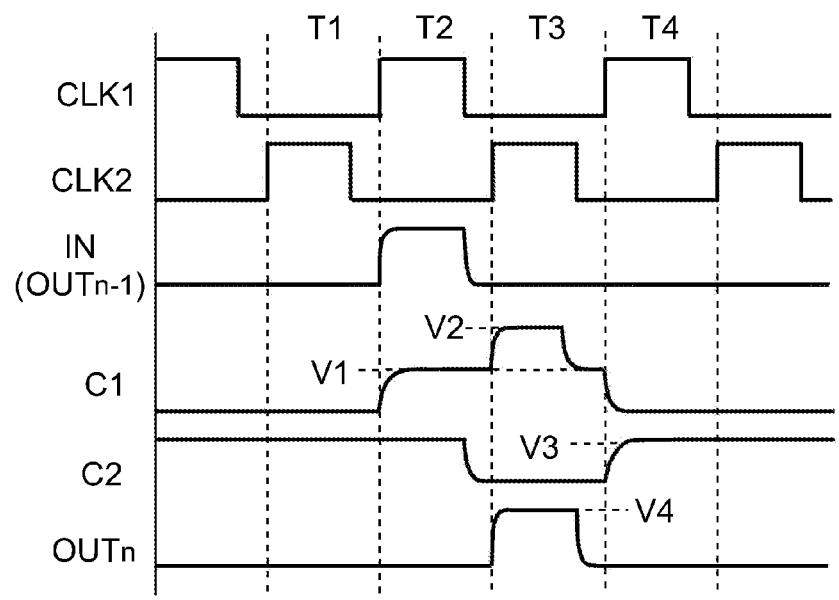
FIG. 11 is a timing chart illustrating operations of a gate driver applicable to a liquid crystal display unit pertaining to one example of the present invention.

Next, description is given to operations of the gate driver with reference to a timing chart. FIG. 11 is a timing chart showing the operations of one block of the gate driver illustrated in FIG. 6, which is applicable to the liquid crystal display unit of the present example. Since this block is assumed as the n-th block among multiple cascade-connected blocks, an input signal indicated with a symbol of IN in FIG. 6 becomes the output signal of the (n−1)th block. A period of each of T1 to T4 represents one horizontal period for writing video signals into one pixel row of the liquid crystal display unit. The one pixel row mentioned here means a row of pixels connected to one arbitrary gate line shown in FIG. 3. Further, it is assumed that the high level of each of clocks CLK1 and CLK2 is the same electric potential as that of the power source VGH and the low level is the same electric potential as that of the power source VGL.

In the period T1, since the input signal IN is at the low level, the electric potential of a node C1 connected to the gate electrode of TFT Tr1 is at the low level. Further, the electric potential of a node C2 connected to the gate electrode of TFT Tr2 holds the high level. The period T2 includes a period during which an input signal is at the high level and the clock CLK1 is also at the high level. Accordingly, TFT Tr3 becomes in a conduction state, and the electric potential of a node C1 rises to V1. Here, the electric potential of V1 is a value smaller by a threshold voltage of TFT Tr3 than the voltage of VGH. The node C1 is at the high level and the node C2 is at the high level in this period, which means that each of TFTs Tr1 and Tr2 is in a conduction state. On the other hand, since the clock CLK2 is at the low level, an output OUTn is at the low level. In the period T2, in a period in which the clock CLK1 is at the high level, TFT Tr5 whose gate electrode is connected to the node C1 is also in a conduction state. On the other hand, the node C2 is kept at the high level during a period in which the clock CLK1 is at the high level. With a change of the clock CLK1 to the low level, TFT Tr4 becomes a non-conduction state, and the electric potential of the node C2 changes to the low level together with the electric potential of the clock CLK1 since TFT Tr5 is made to keep the conduction state. With this, TFT Tr2 also changes from the conduction state to the non-conduction state. However, the output OUTn is made to keep the low level via TFT Tr1 all through in the period T2 since the clock CLK2 is at the low level. In the period T3, since the clock CLK1 is at the low level, TFT Tr4 is in a non-conduction state. Even if TFT Tr5 is a conduction state, the node C2 is made to keep the low level since the clock CLK1 is at the low level, and TFT Tr2 is still in a non-conduction state. Further, since the clock CLK1 is at the low level, TFT Tr3 is in a non-conduction state, and a node C1 is made in a floating state. With a change of the clock CLK2 to the high level, the electric potential of the node C1 rises to V2 together with the rising of the electric potential of the output OUTn because of a capacitive coupling by the parasitic capacitance between the gate and the sources of TFT Tr1 and the capacitance Cb. The electric potential of V2 becomes a value obtained by adding a voltage between VGH-VGL being a voltage amplitude of the clock CLK2 to the electric potential of V1, whereby the electric potential of V2 can be made higher than a value obtained by adding the threshold voltage of TFT Tr1 to the electric potential of VGH. Accordingly, the electric potential V4 of the output OUTn is made to rise finally to the electric potential of VGH. Thereafter, with a change of the clock CLK1 to the low level, the electric potential of the output OUTn also changes to the low level, and the electric potential of the node C1 also lowers by the above-mentioned capacitive coupling. However, since the electric potential of the node C1 does not lower until TFT Tr1 is made to a non-conduction state, the output OUTn reaches the electric potential of VGL which is the low level electric potential of the clock CLK1. In the period T4, the clock CLK1 becomes the high level, each of TFTs Tr3 and Tr4 becomes a conduction state, the electric potential of the node C1 becomes the electric potential of VGL which is the electric potential of the input IN, and the electric potential of the node C2 is charged to the high level by TFT Tr4. The electric potential V3 of the node C2 at this time becomes a value smaller by the threshold voltage of TFT Tr4 than the electric potential of VGH, and TFT Tr2 becomes a conduction state. As a result, the output OUTn is made to keep the electric potential of VGL.

Such operations are performed sequentially in each of the multiple cascade-connected blocks, whereby the gate driver can perform an operation to sequentially output pulses synchronized with the clocks.

As described in the above, there can be provided the liquid crystal display unit of the present example, which does not cause image quality deterioration even under condition that it is irradiated with extremely strong light, by using a liquid crystal panel with a small size.

Further, it becomes possible to protect occurrence of malfunction of the gate driver circuit more than the liquid crystal display unit shown in the above-described embodiment.

The reasons why the liquid crystal display unit shown in the example has the similar effect as that in the embodiment are the same reasons shown in the embodiment. The reasons why it becomes possible to protect malfunction of the gate driver circuit more than the liquid crystal display unit shown in the embodiment are described hereafter.

In the liquid crystal display unit employing the structure that a gate driver circuit is constituted with only TFTs of a single conduction type, even when the output section 620 of the gate driver outputs a signal at a high level, the signal level may not become high sufficiently. Accordingly, malfunction may arise in that the output of the output section 620 cannot be transmitted to the next stage. Such malfunction may be caused by a situation that TFT Tr2 becomes a conduction state due to a certain reason together with a change of the TFT Tr1 to a conduction state. In the liquid crystal display unit shown in the embodiment, the same electric potential as that of the output terminal is applied to a light shielding film disposed beneath each of TFTs Tr1 and Tr2. It means that, when the output of this block becomes a high level, the electric potential of the light shielding film also becomes the high level. With a change of the electric potential of a conductor disposed at the back-channel side of the n type TFT to a high level, a threshold voltage changes in a direction in which the threshold voltage becomes low. Here, if the threshold voltage of TFT Tr2 is relatively small due to variation in manufacturing, an electric current may flow between the source and the drain due to the influence of the electric potential of the light shielding film even under the condition that the gate voltage is at a low level. Such a situation makes the electric potential of the output smaller than the electric potential of VGH because the electric potential of the output is divided at an electric potential between the respective electric potentials of VGH and VGL. In this way, in a series of blocks in which the threshold voltage of TFT Tr2 is small, the output voltage decreases gradually for each time when the output is transferred to the next block, and finally, the output voltage becomes so small that it cannot be transferred.

In the liquid crystal display unit of the present example, different electric potentials are applied to light shielding films disposed separately beneath the respective TFT Tr1 (first TFT) and TFT Tr2 (second TFT) constituting the output section are provided. The same electric potential as that of the output terminal of the output section is applied to the light shielding film disposed beneath TFT Tr1 (first TFT) in which its drain terminal is connected to the clock line. On the other hand, the electric potential of the power source VGL is applied to the light shielding film disposed beneath TFT Tr2 (second TFT) in which its source terminal is connected to the power source VGL. Accordingly, a change of the voltage of an output terminal to a high level merely causes a change of only the threshold voltage of TFT Tr1 in the direction which the threshold voltage becomes small, and it does not make the electric potential of the output terminal lower. Therefore, one of the modes of malfunction does not occur, which makes it difficult to cause malfunction.

In the example shown hitherto, all the pixel TFTs and all the TFTs constituting the gate driver are n-type TFTs. However, only p-type TFTs may be used for them. In the case of using p-type TFTs, the electric potential of the output terminal of the output section may be applied to a light shielding film disposed beneath a TFT which constitutes an output section of a gate driver and in which its drain terminal is connected to a clock line, and the electric potential of the power source VGH may be applied a light shielding film disposed beneath a TFT in which its source terminal is connected to a power source VGH. As for the connecting relationship of TFTs constituting a control section, the TFTs may be connected so as to reverse the relationship between the power sources VGH and VGL, and control clocks may be configured to reverse the relationship between the high level and the low level.

Further, in either of the case that the gate driver is constituted with only n-type TFTs and the case that that is constituted with only p-type TFTs, the control section can employ a circuit constitution other than those shown in FIG. 4 and FIG. 6. For example, the control section may employ a constitution in which a function to switch over the scanning direction of a gate driver is added, or a constitution to control with three phase or more clocks. Furthermore, also the output section may employ a constitution with two or more TFTs in each of which a source terminal is connected to a power source. In such a case, in all the TFTs in each of which a source terminal is connected to the power source, the electric potential of the power source is applied to a light shielding film disposed beneath a corresponding TFT, and a voltage of the output terminal is applied to a light shielding film disposed beneath a TFT in which a drain terminal is connected to a clock line.

Namely, features of the liquid crystal display unit of the above-described embodiment and example are as follows. An electric potential to be applied to light shielding films formed beneath of TFTs in the output section is set as follows. The output section includes a TFT (first TFT) in which a clock line is connected to at least its drain terminal and the electric potential of its gate terminal is stepped up or stepped down in comparison with a range of a power source voltage by a bootstrap effect, and a TFT (second TFT) in which its source terminal is connected to the power source. In the output section, the electric potential to be applied to a light shielding film is changed between a light shielding film disposed beneath the first TFT and a light shielding film disposed beneath the second TFT. In particular, the electric potential of the output terminal is applied to the light shielding film disposed beneath a TFT (first TFT) to which the electric potential of its gate terminal is stepped up or stepped down by a bootstrap effect. Further, a position covered with a package member is set such that a light shielding film is disposed beneath only a TFT constituting the output section and a light shielding film is not needed to be disposed beneath a TFT constituting the control section.

The present invention should not be limited to the above-mentioned embodiments and examples, and unless any change deviates from the intention of the present invention, such a change may be made appropriately for the constitution of the liquid crystal display unit.

The liquid crystal display units of the above-described embodiments and examples of the present invention can be applied to a display unit in which a liquid crystal display unit is irradiated with extremely strong light, such as a liquid crystal projector and a head-up display.

The invention claimed is:

1. A liquid crystal display unit comprising:
   an insulating substrate;
   a counter insulating substrate facing the insulating substrate;
   a liquid crystal put between the insulating substrate and the counter insulating substrate;

a pixel matrix including a plurality of pixels each including a pixel capacitor and a pixel TFT; and a peripheral circuit including a control section and an output section, for driving a gate line of the pixel TFT in each of the pixels, each of the control section and the output section including TFTs, wherein the pixel matrix and the peripheral circuit are integrally formed in one body and formed on the insulating substrate, the output section is located closer to the pixel matrix than the control section when being viewed from a normal direction of the insulating substrate, the pixel TFTs of the pixels and the TFTs in the peripheral circuit have a top-gate structure, and the liquid crystal display unit further comprises a light shielding metal disposed at an insulating-substrate side of the pixel TFT in each of the pixels, and a light shielding metal disposed at an insulating-substrate side of each of the TFTs at least in the output section among the TFTs in the peripheral circuit.

2. The liquid crystal display unit of claim 1, wherein the control section includes a TFT at the insulating-substrate side of which a light shielding metal is not disposed.

3. The liquid crystal display unit of claim 1, wherein the TFTs in the peripheral circuit are TFTs of a same conductivity type, the TFTs in the output section includes a first TFT whose gate voltage is to be stepped up or stepped down by a bootstrap method, and the light shielding metal formed on the insulating-substrate side of the first TFT has a same electric potential as an electric potential of an output terminal of the output section.

4. The liquid crystal display unit of claim 3, the TFTs in the peripheral circuit includes a second TFT at the insulating-substrate side of which a light shielding metal is disposed, the second TFT being different from the first TFT, and the light shielding metal disposed at the insulating-substrate side of the second TFT has a same electric potential as that of a source electrode of the second TFT.

5. The liquid crystal display unit of claim 1, wherein the light shielding metal disposed at the insulating-substrate side of the pixel TFT in each of the pixels, hides a semiconductor layer of the corresponding pixel TFT, when being viewed from the normal direction of the insulating substrate, and the light shielding metal disposed at the insulating-substrate side of each of the TFTs in at least the output section among the TFTs in the peripheral circuit, hides a semiconductor layer of the corresponding TFT, when being viewed from the normal direction of the insulating substrate.

6. The liquid crystal display unit of claim 1, further comprising a package member made of a material which does not transmit light, wherein the package member covers the insulating substrate and the counter insulating substrate, and includes an opening section formed thereon, and an edge surface of the opening section overlaps with the output section when being viewed from the normal direction of the insulating substrate.

7. The liquid crystal display unit of claim 6, wherein the edge surface of the opening section is located in a middle of a pixel-matrix-side edge of the control section and a peripheral-circuit-side edge of the pixel matrix when being viewed from a normal direction of the insulating substrate.

* * * * *